United States Patent
Klassen

(10) Patent No.: US 9,148,503 B2
(45) Date of Patent: Sep. 29, 2015

(54) DIFFERENTIATING A PORTION OF A TEXT MESSAGE SHOWN IN A LISTING ON A HANDHELD COMMUNICATION DEVICE USING AN ICON

(75) Inventor: Gerhard Dietrich Klassen, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 48 days.

(21) Appl. No.: 13/615,405

(22) Filed: Sep. 13, 2012

(65) Prior Publication Data

US 2013/0007173 A1 Jan. 3, 2013

Related U.S. Application Data

(63) Continuation of application No. 11/868,309, filed on Oct. 5, 2007, now Pat. No. 8,311,562.

(51) Int. Cl.
*G06F 15/16* (2006.01)
*H04M 1/725* (2006.01)

(52) U.S. Cl.
CPC ................... *H04M 1/72552* (2013.01)

(58) Field of Classification Search
USPC ............... 455/412.1, 422.1, 424, 466
See application file for complete search history.

(56) References Cited

U.S. PATENT DOCUMENTS

| | | | |
|---|---|---|---|
| 6,895,426 B1 | 5/2005 | Cortright et al. | |
| 2004/0103155 A1* | 5/2004 | Perepa et al. | 709/206 |
| 2004/0137884 A1 | 7/2004 | Engstrom et al. | |
| 2006/0200530 A1 | 9/2006 | Tokuda et al. | |
| 2007/0192711 A1 | 8/2007 | Lee et al. | |
| 2009/0005011 A1* | 1/2009 | Christie et al. | 455/412.2 |
| 2013/0067054 A1* | 3/2013 | Pulleyn et al. | 709/223 |

FOREIGN PATENT DOCUMENTS

| | | |
|---|---|---|
| WO | 2004040461 | 5/2004 |
| WO | 2005055034 | 6/2005 |

OTHER PUBLICATIONS

Notice of Allowance and Fee(s) Due mailed Oct. 31, 2012, in corresponding Canadian patent application No. 2,640,466.
Office Action mailed Mar. 14, 2012, in corresponding Canadian patent application No. 2,640,466.
Extended European Search report dated Jan. 15, 2009, in corresponding European patent application No. 07117949.3.
Partial Search Report mailed Oct. 1, 2008, in corresponding European patent application No. 07117949.3.
Notice of Allowance and Fee(s) Due mailed Nov. 20, 2009, in corresponding European patent application No. 07117949.3.

(Continued)

*Primary Examiner* — Sam Bhattacharya
(74) *Attorney, Agent, or Firm* — Fish & Richardson P.C.

(57) ABSTRACT

A handheld wireless communication device includes features to send and receive text messages. The handheld wireless communication device is further equipped with a microprocessor configured to run software programs on the device such as text message management program. The text message management program displays a listing of a plurality of received text messages on a display screen and differentiates at least a portion of the display-listed plurality of received text messages using an icon associated with at least one text message and wherein said icon corresponds to a domain address of the associated text message.

20 Claims, 7 Drawing Sheets

(56) References Cited

OTHER PUBLICATIONS

RFC 822: Standard for the Format of ARPA Internet Text Messages, Aug. 13, 1982, revised by David H. Crocker retrieved from "http://www.ietf.org/rfc0822.txt" on Sep. 30, 2011.

Anonymous: "Blackberry 8310: Ab Aug. bei Vodafone erhältlich", Internet Citation, [online] Aug. 1, 2007, XP002474888; URL:http://www.pcwelt.de/start/mobility_handy_pda/pda_smartphone/news/89193/blackberry_8310_ab_august_bei_vodaphone_erhaeltlich/index.html; retrieved on Apr. 2, 2008; the whole document.

Research in Motion: "Blackberry—Getting Started Guide. Blackberry 7100i" Internet Citation, [Online] XP002456393 Retrieved from the Internet: URL:http://it.scu.edu/Blackberry/userguide_bb7100i.pdf; retrieved on Oct. 1, 2007; p. 1.

Anonymous: Vodafone: Blackberry Curve jetzt mit GPS Internet Citation, [online] (Aug. 1, 2007), XP002474887; retrieved from the Internet: URL:http://www.pcwelt.de/start/mobility_handy_pda/pda_smartphone/news/89193/blackberry_8310_ab_august_bei_vodafone_erhaeltlich/index.html (retrieved on Apr. 2, 2008; the whole document.

\* cited by examiner

| 1 | 2 | 3 | 4 | 5 | 6 | 7 | 8 | 9 | 0 |
|---|---|---|---|---|---|---|---|---|---|
| Q | W | E | R | T | Y | U | I | O | P |
| A | S | D | F | G | H | J | K | L | |
| Z | X | C | V | B | N | M | | | |

| 1 | 2 | 3 | 4 | 5 | 6 | 7 | 8 | 9 | 0 |
|---|---|---|---|---|---|---|---|---|---|
| Q | W | E | R | T | Z | U | I | O | P |
| A | S | D | F | G | H | J | K | L | |
| Y | X | C | V | B | N | M | | | |

| 1 | 2 | 3 | 4 | 5 | 6 | 7 | 8 | 9 | 0 |
|---|---|---|---|---|---|---|---|---|---|
| A | Z | E | R | T | Y | U | I | O | P |
| Q | S | D | F | G | H | J | K | L | |
| W | X | C | V | B | N | M | | | |

| 1 | 2 | 3 | 4 | 5 | 6 | 7 | 8 | 9 | 0 |
|---|---|---|---|---|---|---|---|---|---|
| | | | P | Y | F | G | C | R | L |
| A | O | E | U | I | D | H | T | N | S |
| | Q | J | K | X | B | M | W | V | Z |

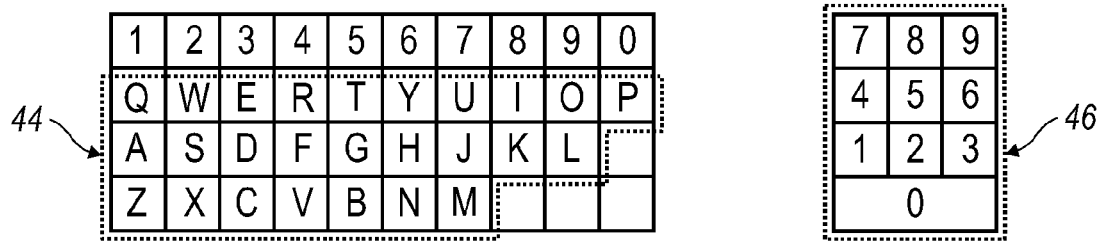
*FIG. 4*
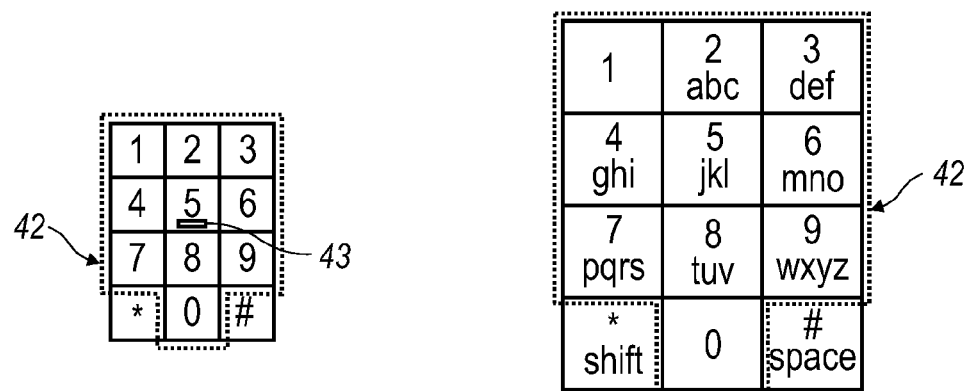
*FIG. 5*  *FIG. 6*

US 9,148,503 B2

DIFFERENTIATING A PORTION OF A TEXT MESSAGE SHOWN IN A LISTING ON A HANDHELD COMMUNICATION DEVICE USING AN ICON

CROSS-REFERENCE TO RELATED APPLICATION

This application is a continuation of U.S. application Ser. No. 11/868,309, filed on Oct. 5, 2007 and entitled Differentiating a Portion of a Text Message Shown in a Listing on a Handheld Communication Device Using an Icon, which application is fully incorporated by reference herein.

FIELD

This disclosure, in a broad sense, is directed toward a handheld communication device that has wireless communication capabilities and the networks within which the wireless communication device operates. The present disclosure further relates to icon-differentiating a text message based upon a characteristic common to other received text messages.

BACKGROUND

With the proliferation of wireless communication systems, compatible handheld communication devices are becoming more prevalent, as well as advanced. Whereas in the past such handheld communication devices were typically limited to either voice transmission (cell phones) or text transmission (pagers and PDAs), today's consumer often demands a multifunctional device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS). As might be expected, suppliers of such mobile communication devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

Keyboards are used on many handheld devices, including telephones and mobile communication devices. The size of keyboards has been reduced over the years, as newer, smaller devices have become popular. Cell phones, for example, are now sized to fit in one's pocket or the palm of the hand. As the size of the devices has decreased, the more important it has become to utilize the entire keyboard surface as efficiently as possible.

Many keyboards on mobile devices have an input device for navigation through the graphical user interface. These interfaces include such devices as trackballs and rotating wheels which can be used to effect movement of a cursor or pointer, or to scroll up, down and about a displayed page. These navigation devices often occupy a relatively large amount of space on the incorporating mobile device. Because the navigation device is frequently used and often requires fine control, a lower end size limitation will normally be observed by device designers. To accommodate such larger, more convenient navigation devices on the housing of the mobile device, the amount of space that is available for the keys of the keyboard is correspondingly reduced if the keyboard and navigational device are proximately located to one another.

As the proliferation of wireless handheld communication devices continue, users increasingly send and receive text messages on their handheld communication devices. Moreover, in sending and receiving email messages, many users implement filters on their desktop computers in order to prioritize or otherwise sort through the incoming and/or outgoing messages. However, such filters may not be available on the handheld communication device text message management software. Thus, an easy way to distinguish the intended recipient or sender of a text message is needed.

BRIEF DESCRIPTION OF THE DRAWINGS

Examplary methods and arrangements conducted and configured according to the advantageous solutions presented herein are depicted in the accompanying drawings wherein:

FIG. 3a illustrates an examplary QWERTY keyboard layout;

FIG. 3b illustrates an examplary QWERTZ keyboard layout;

FIG. 3c illustrates an examplary AZERTY keyboard layout;

FIG. 3d illustrates an examplary Dvorak keyboard layout;

FIG. 4 illustrates a QWERTY keyboard layout paired with a traditional ten-key keyboard;

FIG. 5 illustrates ten digits comprising the numerals 0-9 arranged in a traditional, ITU Standard E.161 numeric telephone keypad layout, including the * and # keys flanking the 0 key;

FIG. 6 illustrates a traditional or standard phone key arrangement or layout according to the ITU Standard E.161 including both numerals and letters;

DETAILED DESCRIPTION

Figure 1:
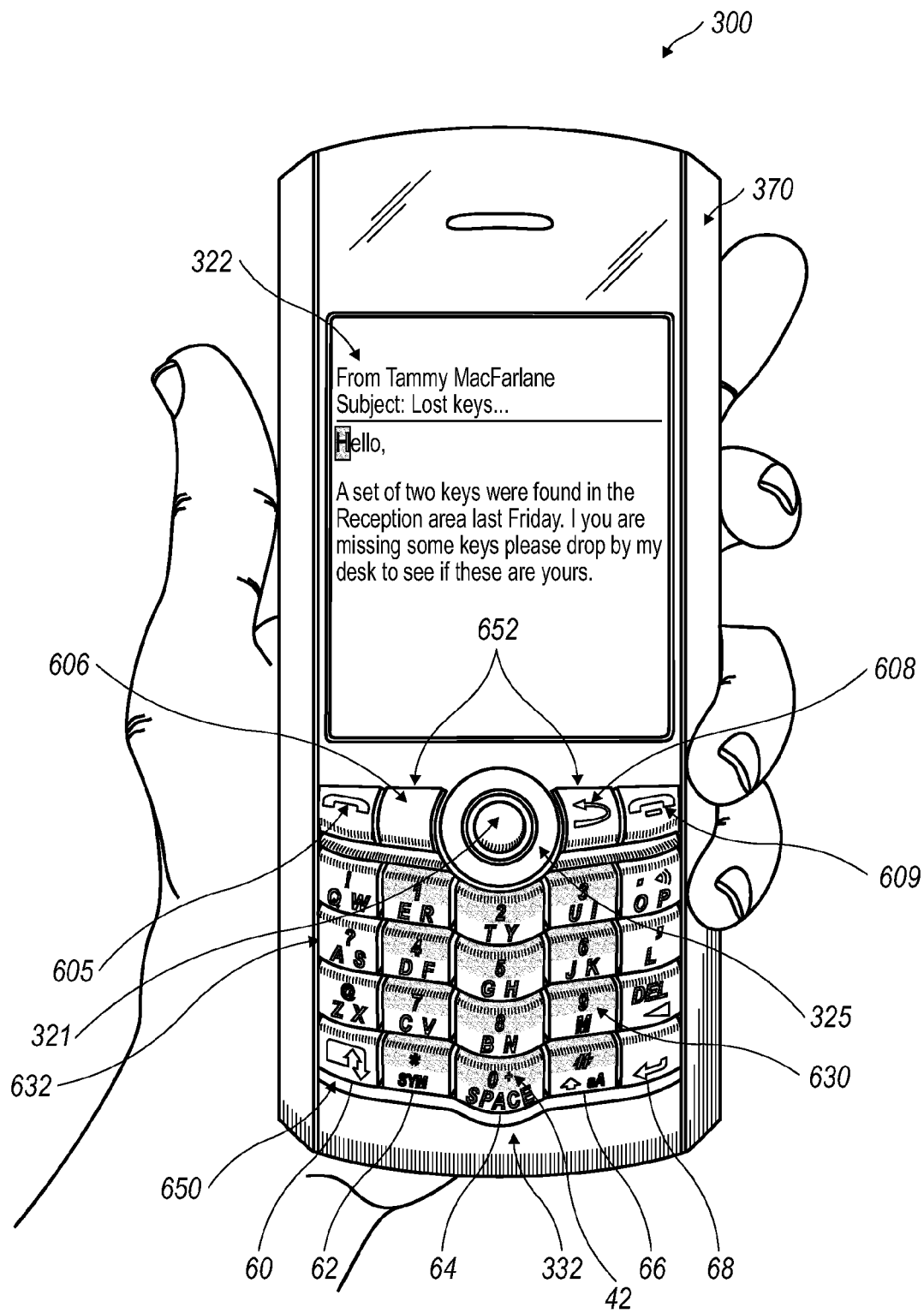
FIG. 1 illustrates a handheld wireless communication device configured according to the present teachings cradled in the palm of a user's hand.
Figure 2:
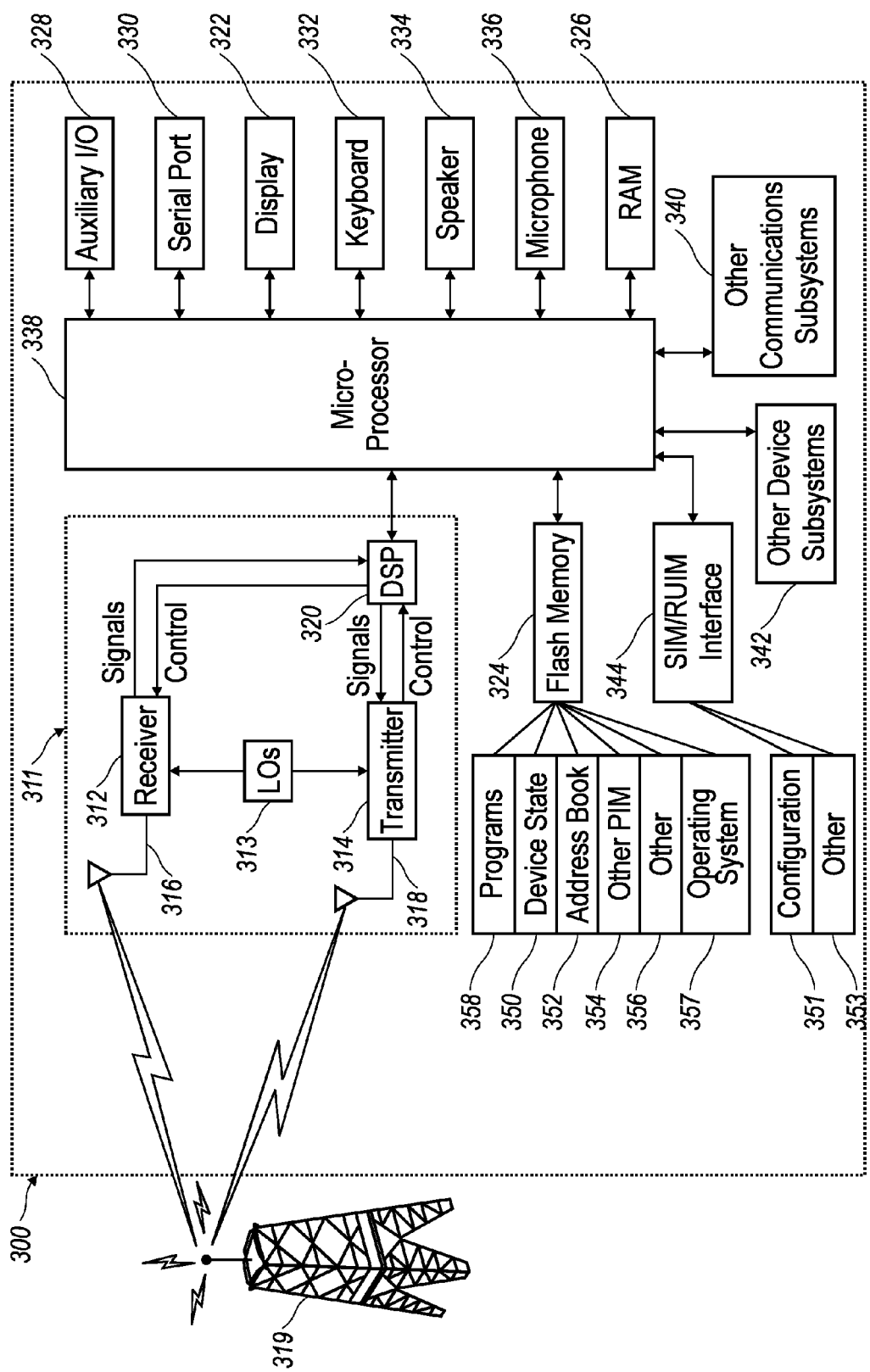
FIG. 2 is a block diagram representing a wireless handheld communication device interacting in a communication network.

An examplary handheld wireless communication device 300 is shown in FIG. 1, and the device's cooperation in a wireless network 319 is exemplified in the block diagram of FIG. 2. These figures are examplary only, and those persons skilled in the art will appreciate the additional elements and modifications necessary to make the device 300 work in particular network environments.

As shown in the block diagram of FIG. 2, the handheld device 300 includes a microprocessor 338 that controls the operation of the device 300. A communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communication subsystems 340 and other device subsystems 342 are generally indicated as being functionally connected with the microprocessor 338 as well. An example of a communication subsystem 340 is that of a short range communication system such as BLUETOOTH® communication module or a Wi-Fi communication module (a communication module in compliance with IEEE 802.11b) and associated circuits and components. Additionally, the microprocessor 338 is able to perform operating system functions and preferably enables execution of software applications on the handheld wireless communication device 300.

The auxiliary I/O subsystem 328 can take the form of a variety of different navigation tools (multi-directional or single-directional) such as a trackball navigation tool 325 as illustrated in the examplary embodiment shown in FIG. 1, or a thumbwheel, a navigation pad, a joystick, or the like. These navigation tools are preferably located on the front surface of the handheld device 300 but may be located on any exterior surface of the handheld device 300. Other auxiliary I/O subsystems can include external display devices and externally connected keyboards (not shown). While the above examples have been provided in relation to the auxiliary I/O subsystem 328, other subsystems capable of providing input or receiving output from the handheld device 300 are considered within the scope of this disclosure. Additionally, other keys may be placed along the side of the handheld device 300 to function as escape keys, volume control keys, scrolling keys, power switches, or user programmable keys, and may likewise be programmed accordingly.

As may be appreciated from FIG. 1, the handheld wireless communication device 300 comprises a lighted display 322 located above a keyboard 332 constituting a user input and suitable for accommodating textual input to the handheld wireless communication device 300. The front face 370 of the device has a navigation row 70 and a key field 650 that includes alphanumeric keys 630, alphabetic keys 632, numeric keys 42, and other function keys as shown in FIG. 1. As shown, the handheld device 300 is of unibody construction, also known as a "candy-bar" design.

Keys, typically of a push-button or push-pad nature, perform well as data entry devices but present problems to the user when they must also be used to effect navigational control over a screen-cursor. In order to solve this problem the present handheld wireless communication device 300 preferably includes an auxiliary input that acts as a cursor navigational tool and which is also exteriorly located upon the front face 370 of the device 300. Its front face location is particularly advantageous because it makes the tool easily thumb-actuable like the keys of the keyboard. A particularly usable embodiment provides the navigational tool in the form of a trackball 321 which is easily utilized to instruct two-dimensional screen cursor movement in substantially any direction, as well as act as an actuator when the trackball 321 is depressed like a button. The placement of the navigation tool is preferably above the keyboard 332 and below the display screen 322; here, it avoids interference during keyboarding and does not block the user's view of the display screen 322 during use. (See FIG. 1).

As illustrated in FIG. 1, the present disclosure is directed to a handheld wireless communication device 300 configured to send and receive text messages. The handheld device 300 includes a hand cradleable body configured to be held in one hand by an operator of the device during text entry. A display 322 is included that is located on a front face 370 of the body and upon which information is displayed to the operator during text entry. A key field 650 is also located on the front face 370 of the elongate body and comprises a plurality of keys including a plurality of alphanumeric keys, symbol keys, and function keys. A navigation row 70 including menu keys 652 and a navigation tool 327 is also located on the front face 370 of the body. The alphanumeric input keys comprise a plurality of alphabetic and/or numeric keys 632 having letters and/or numbers associated therewith. The order of the letters of the alphabetic keys 632 on the presently disclosed handheld device 300 can be described as being of a traditional, but non-ITU Standard E.161 layout. This terminology has been utilized to delineate the fact that such a telephone keypad as depicted in FIG. 6 may not allow for efficient text entry on the handheld device 300.

The handheld wireless communication device 300 is also configured to send and receive voice communications such as mobile telephone calls. To facilitate telephone calls, two call keys 605, 609 ("outer keys") are provided in the upper, navigation row 70 (so-called because it includes the navigation tool assembly 327) at the outer ends of the navigation row 70. One of the two call keys is a call initiation key 605, and the other is a call termination key 609. The navigation row 70 also includes another pair of keys ("flanking keys") that are located immediately adjacent to the navigation tool 327, with one flanking key on either side of the navigation tool 327. It is noted that the outer keys are referred to as such not because they are necessarily the outermost keys in the navigation row—there may be additional keys located even further outwardly of the outer keys if desired—but rather because they are located outwardly with respect to the flanking keys. The flanking keys may, for instance, constitute the menu keys 652, which include a menu call-up key 606 and an escape or back key 608. The menu call-up key 606 is used to bring up a menu on the display screen 322 and the escape key 608 is used to return to the previous screen or previous menu selection. The functions of the call keys and the menu keys may, of course, be provided by buttons that are located elsewhere on the handheld device 300, with different functions assigned to the outer keys and the flanking keys.

Furthermore, the handheld device 300 is equipped with components to enable operation of various programs, as shown in FIG. 2. In an examplary embodiment, the flash memory 324 is enabled to provide a storage location for the operating system 357, device programs 358, and data. The operating system 357 is generally configured to manage other application programs 358 that are also stored in memory 324 and executable on the processor 338. The operating system 357 honors requests for services made by application programs 358 through predefined application program 358 interfaces. More specifically, the operating system 357 typically determines the order in which multiple applications 358 are executed on the processor 338 and the execution time allotted for each application 358, manages the sharing of memory 324 among multiple applications 358, handles input and output to and from other device subsystems 342, and so on. In addition, users can typically interact directly with the operating system 357 through a user interface usually including the keyboard 332 and display screen 322. While in an examplary embodiment the operating system 357 is stored in flash memory 324, the operating system 357 in other embodiments is stored in read-only memory (ROM) or similar storage element (not shown). As those skilled in the art will appreciate, the operating system 357, device application 358 or parts thereof may be loaded in RAM 326 or other volatile memory.

In one examplary embodiment, the flash memory 324 contains programs/applications 358 for execution on the handheld device 300 including an address book 352, a personal information manager (PIM) 354, and the device state 350. Furthermore, programs 358 and other information 356 including data can be segregated upon storage in the flash memory 324 of the handheld device 300.

When the handheld device 300 is enabled for two-way communication within the wireless communication network 319, it can send and receive signals from a mobile communication service. Examples of communication systems enabled for two-way communication include, but are not limited to, the General Packet Radio Service (GPRS) network, the Universal Mobile Telecommunication Service (UTMS) network, the Enhanced Data for Global Evolution (EDGE) network, and the Code Division Multiple Access (CDMA) network and those networks, generally described as packet-switched, narrowband, data-only technologies which are mainly used for short burst wireless data transfer. For the systems listed above, the handheld wireless communication device 300 must be properly enabled to transmit and receive signals from the communication network 319. Other systems may not require such identifying information. GPRS, UMTS, and EDGE require the use of a Subscriber Identity Module (SIM) in order to allow communication with the communication network 319. Likewise, most CDMA systems require the use of a Removable Identity Module (RUIM) in order to communicate with the CDMA network. The RUIM and SIM card can be used in multiple different communication devices 300. The handheld communication device 300 may be able to operate some features without a SIM/RUIM card, but it will not be able to communicate with the network 319. A SIM/RUIM interface 344 located within the device 300 allows for removal or insertion of a SIM/RUIM card (not shown). The SIM/RUIM card features memory and holds key configurations 351, and other information 353 such as identification and subscriber related information. With a properly enabled communication device 300, two-way communication between the handheld wireless communication device 300 and communication network 319 is possible.

If the handheld wireless communication device 300 is enabled as described above or the communication network 319 does not require such enablement, the two-way communication enabled handheld device 300 is able to both transmit and receive information from the communication network 319. The transfer of communication can be from the handheld device 300 or to the device 300. In order to communicate with the communication network 319, the handheld device 300 in the presently described examplary embodiment is equipped with an integral or internal antenna 318 for transmitting signals to the communication network 319. Likewise the handheld wireless communication device 300 in the presently described examplary embodiment is equipped with another antenna 316 for receiving communication from the communication network 319. These antennae (316, 318) in another examplary embodiment are combined into a single antenna (not shown). As one skilled in the art would appreciate, the antenna or antennae (316, 318) in another embodiment are externally mounted on the handheld device 300.

When equipped for two-way communication, the handheld wireless communication device 300 features a communication subsystem 311. As is well known in the art, this communication subsystem 311 is modified so that it can support the operational needs of the handheld device 300. The subsystem 311 includes a transmitter 314 and receiver 312 including the associated antenna or antennae (316, 318) as described above, local oscillators (LOs) 313, and a processing module 320 which in the presently described examplary embodiment is a digital signal processor (DSP) 320.

It is contemplated that communication by the handheld device 300 with the wireless network 319 can be any type of communication that both the wireless network 319 and handheld device 300 are enabled to transmit, receive and process. In general, these can be classified as voice and data. Voice communication is communication in which signals for audible sounds are transmitted by the handheld device 300 through the communication network 319. Data is all other types of communication that the handheld device 300 is capable of performing within the constraints of the wireless network 319.

Example device applications that can depend on such data include email, contacts and calendars. For each such application synchronization with home-based versions on the applications can be critical for either or both of their long term and short term utility. As an example, emails are often time sensitive, so substantially real time synchronization is highly desirable. Contacts, on the other hand, can be usually updated less frequently without inconvenience. Therefore, the utility of the handheld device 300 is significantly enhanced (if not enabled) when connectable within a communication system, and particularly when connectable on a wireless basis in a network 319 in which voice, text messaging, and other data transfer are accommodated.

As intimated hereinabove, one of the more important aspects of the handheld wireless communication device 300 to which this disclosure is directed is its size. While some users will grasp the handheld device 300 in both hands, it is intended that a predominance of users will cradle the handheld device 300 in one hand in such a manner that input and control over the handheld device 300 can be effected using the thumb of the same hand in which the handheld device 300 is held. However, it is appreciated that additional control can be effected by using both hands. As a handheld device 300 that is easy to grasp and desirably pocketable, the size of the handheld device 300 must be kept commensurately small. Of the device's dimensions, limiting its width is important for the purpose of assuring cradleability in a user's hand. Moreover, it is preferred that the width of the handheld device 300 be maintained at less than eight centimeters (approximately three inches). Keeping the handheld device 300 within these dimensional limits provides a hand cradleable unit that users prefer for its usability and portability. Limitations with respect to the height (length) of the handheld device 300 are less stringent when considering hand-cradleability. Therefore, in order to gain greater size, the handheld device 300 can be advantageously elongated so that its height is greater than its width, but still remains easily supported and operated in one hand.

A potential drawback is presented by the small size of the handheld device 300 in that there is limited exterior surface area for the inclusion of user input and device output features. This is especially true for the "prime real estate" on the front face 370 of the handheld device 300, where it is most advantageous to include a display screen 322 that outputs information to the user. The display screen 322 is preferably located above a keyboard 332 that is utilized for data entry into the handheld device 300 by the user. If the screen 322 is provided below the keyboard 332, a problem occurs in that viewing the screen 322 is inhibited when the user is inputting data using the keyboard 332. Therefore it is preferred that the display screen 322 be above the input area, thereby solving the problem by assuring that the hands and fingers do not block the view of the screen 322 during data entry periods.

To facilitate textual data entry into the handheld device 300, an alphabetic keyboard 332 is provided. In the examplary illustrated embodiment, a full alphabetic keyboard 332 is utilized in which there is one key per letter (with some of the letter keys also having numbers, symbols, or functions associated with them). In this regard, the associated letters can be advantageously organized in QWERTY, QWERTZ, AZERTY, or Dvorak layouts, among others, thereby capitalizing on certain users' familiarity with these various letter orders. In order to stay within the bounds of the limited front surface area, however, each of the keys must be commensurately small when, for example, twenty-six keys must be provided in the instance of the English language.

As shown in FIG. 1, the handheld wireless communication device 300 is cradleable in the palm of a user's hand. The handheld device 300 is provided with a keyboard 332 to enter text data and place telephone calls and a display screen 322 for communicating information to the user. A connect/send key 605 is preferably provided to aid in the placement of a phone call. Additionally, a disconnect/end key 609 is provided. The send key 605 and end key 609 preferably are arranged in the navigation row 70 including the navigation tool 327. Additionally, the navigation row 70 preferably has a menu call-up key 606 and a back key or escape key 608.

The keyboard 332 includes a plurality of keys that can be of a physical nature such as actuable buttons, or they can be of a software nature, typically constituted by virtual representations of physical keys on a display screen 322 (referred to herein as "virtual keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application 358 or feature in use, specific keys can be enabled or disabled.

In the case of physical keys, all or a portion of the plurality of keys have one or more indicia representing character(s), command(s), and/or functions(s) displayed at their top surface and/or on the surface of the area adjacent the respective key. In the instance where the indicia of a key's function is provided adjacent the key, the indicia can be printed on the device cover beside the key, or in the instance of keys located adjacent the display screen 322. Additionally, current indicia for the key may be temporarily shown nearby the key on the screen 322.

In the case of virtual keys, the indicia for the respective keys are shown on the display screen 322, which in one embodiment is enabled by touching the display screen 322, for example, with a stylus to generate the character or activate the indicated command or function. Some examples of display screens 322 capable of detecting a touch include resistive, capacitive, projected capacitive, infrared and surface acoustic wave (SAW) touchscreens.

Physical and virtual keys can be combined in many different ways as appreciated by those skilled in the art. In one embodiment, physical and virtual keys are combined such that the plurality of enabled keys for a particular application or feature of the handheld wireless communication device 300 is shown on the display screen 322 in the same configuration as the physical keys. Using this configuration, the user can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

The various characters, commands, and functions associated with keyboard typing in general are traditionally arranged using various conventions. The most common of these in the United States, for instance, is the QWERTY keyboard layout. Others include the QWERTZ, AZERTY, and Dvorak keyboard configurations. The QWERTY keyboard layout is the standard English-language alphabetic key arrangement 44a shown in FIG. 3a. The QWERTZ keyboard layout is normally used in German-speaking regions; this alphabetic key arrangement 44b is shown in FIG. 3b. The AZERTY keyboard layout 44c is normally used in French-speaking regions and is shown in FIG. 3c. The Dvorak keyboard layout was designed to allow typists to type faster; this alphabetic key arrangement 44d is shown in FIG. 3d. In other examplary embodiments, keyboards having multi-language key arrangements can be implemented.

Figure 9:
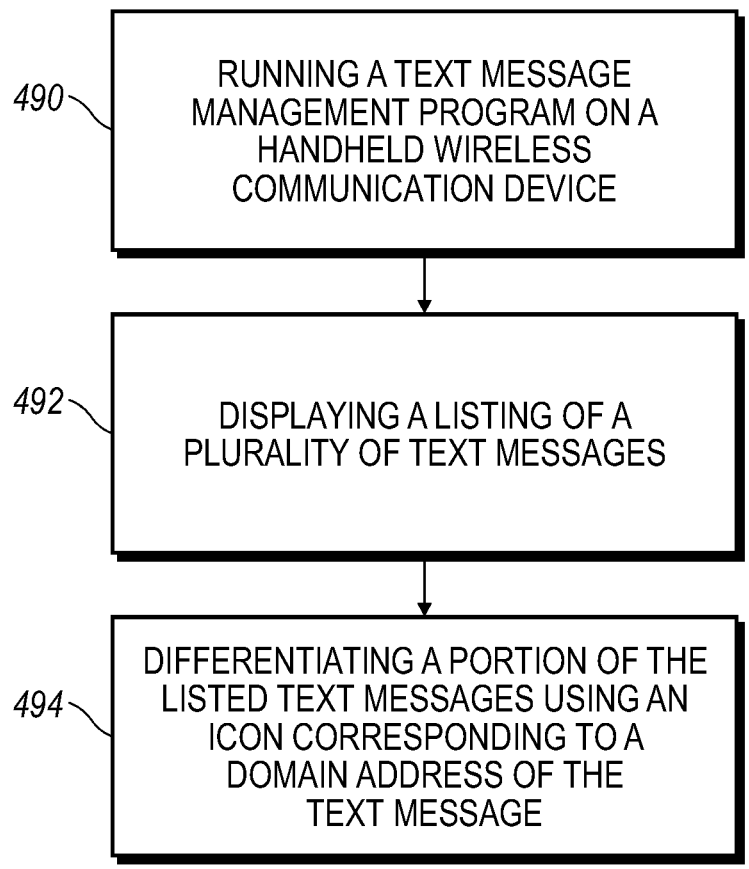
FIG. 9 is a flow chart illustrating an examplary method for icon-differentiating an email by an icon from a domain associated with the email address.

Alphabetic key arrangements are often presented along with numeric key arrangements. Typically, the numbers 1-9 and 0 are positioned in the row above the alphabetic keys 44a-d, as shown in FIG. 3a-d. Alternatively, the numbers share keys with the alphabetic characters, such as the top row of the QWERTY keyboard. Yet another examplary numeric key arrangement is shown in FIG. 4, where a "ten-key" style numeric keypad 46 is provided on a separate set of keys that is spaced from the alphabetic/numeric key arrangement 44. Still further, ten-key numeric arrangements may be common with or shared with a subset of the alphabetic keys, as best shown in FIGS. 9 and 10. The ten-key styled numeric keypad 46 includes the numbers "7", "8", "9" arranged in a top row, "4", "5", "6" arranged in a second row, "1", "2", "3" arranged in a third row, and "0" in a bottom row. Further, a numeric phone key arrangement 42 is exemplarily illustrated in FIG. 5.

As shown in FIG. 5, the numeric phone key arrangement 42 may also utilize a surface treatment on the surface of the center "5" key. This surface treatment is configured such that the top surface of the key is distinctive from the surface of other keys. Preferably the surface treatment is in the form of a raised bump or recessed dimple 43. Alternatively, raised bumps may be positioned on the housing around the "5" key and do not necessarily have to be positioned directly on the key.

It is desirable for handheld devices 300 to include a combined text-entry keyboard and a telephony keyboard. Examples of such handheld devices 300 include mobile stations, cellular telephones, wireless personal digital assistants (PDAs), two-way paging devices, and others. Various keyboards are used with such devices and can be termed a full keyboard, a reduced-format keyboard, or phone key pad. In embodiments of a handheld device 300 having a full keyboard, the alphabetic characters are singly associated with the plurality of physical keys. Thus, in an English-language keyboard of this configuration, there are at least 26 keys in the plurality, with one letter per alphabetic key.

FIGS. 5 and 6 both feature numeric keys arranged according to the ITU Standard E.161 form. In addition, FIG. 6 also incorporates alphabetic characters according to the ITU Standard E.161 layout as well.

Figure 7:
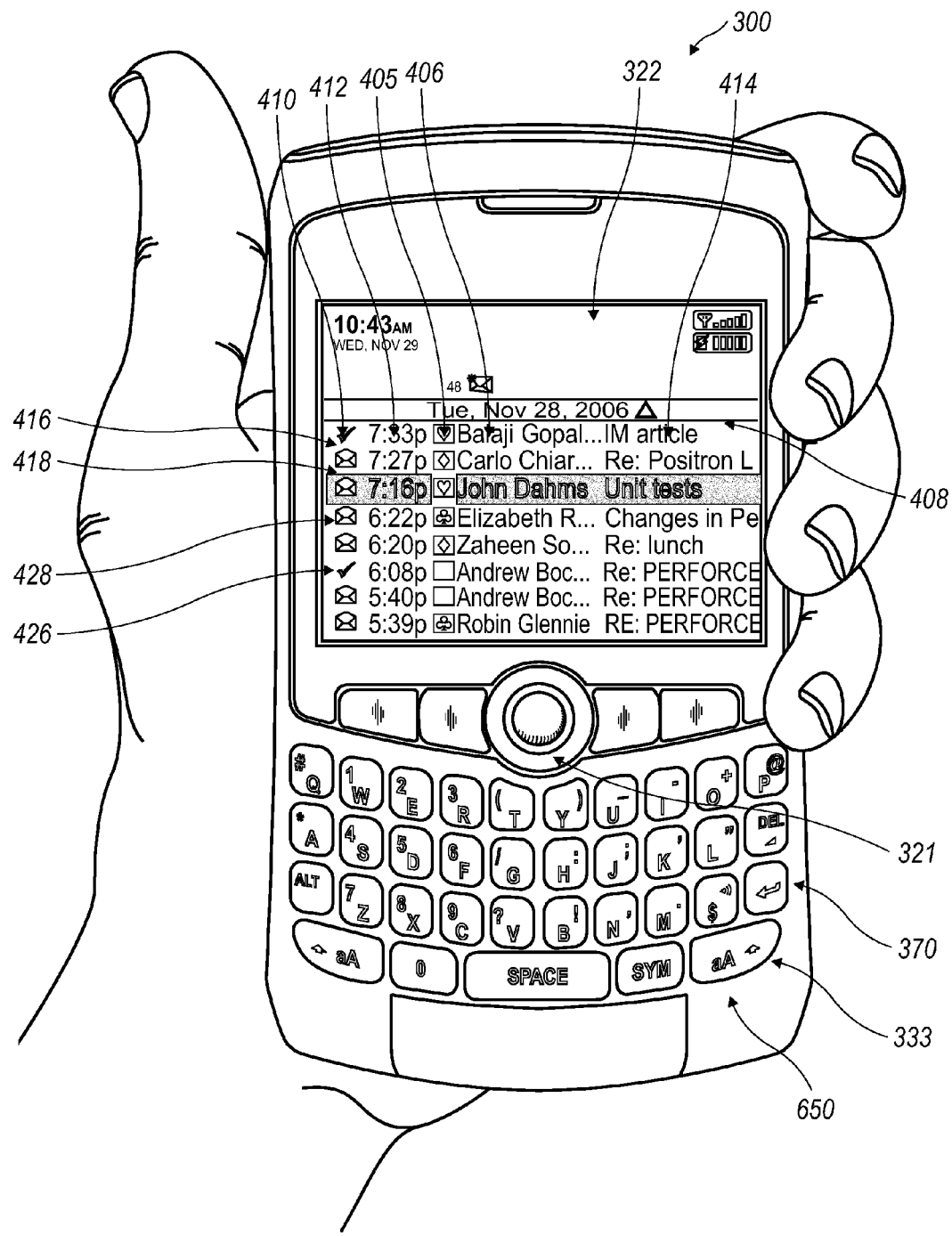
FIG. 7 illustrates an exemplary handheld device with an email shown on the display screen, where the email is differentiated by an icon from a domain associated with the email address.
Figure 8:
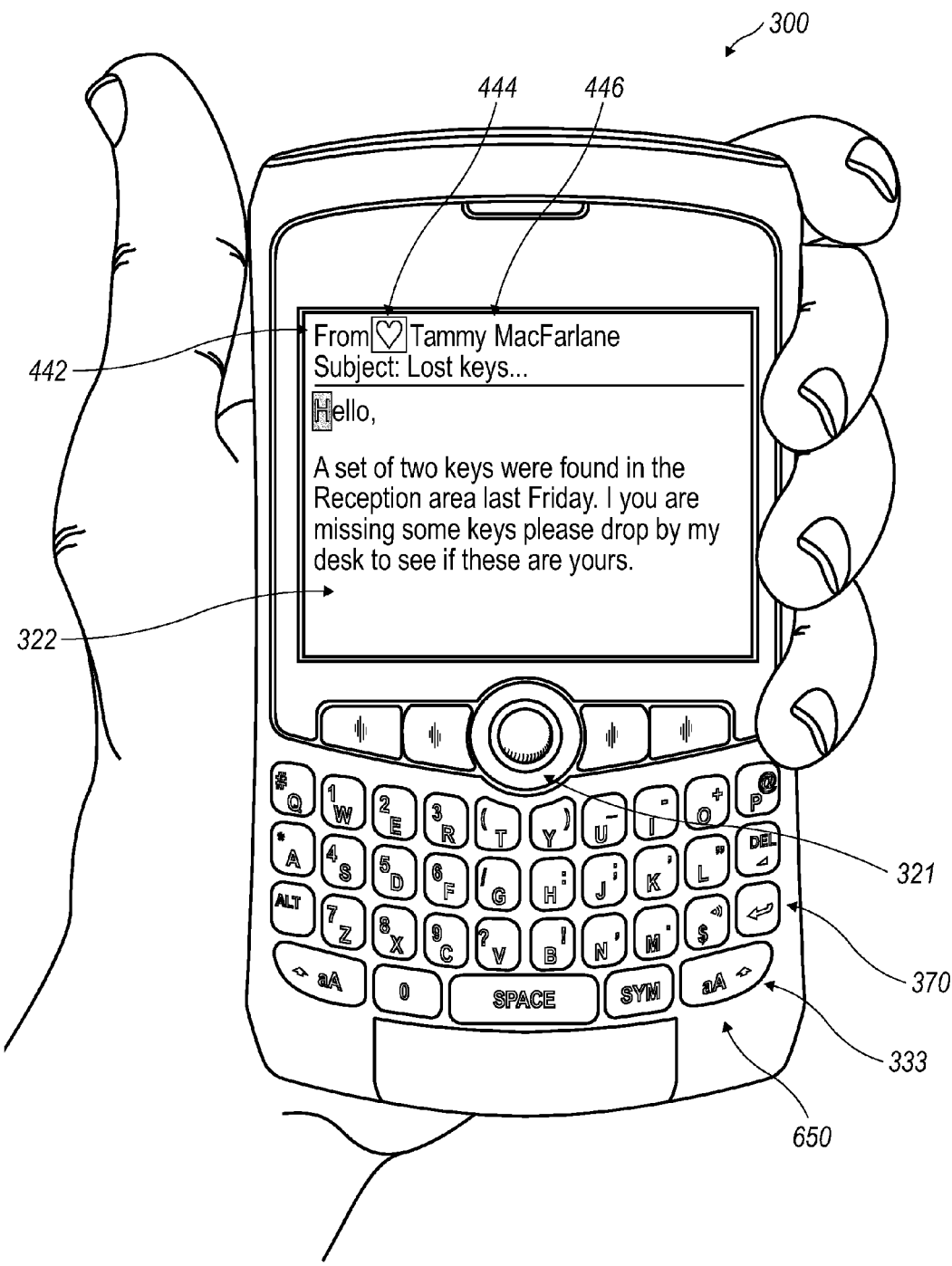
FIG. 8 illustrates another email listing shown on the display screen of the handheld wireless communication device, where each email is icon-differentiated from a domain associated with the email address.

Reference is now made to FIGS. 7-8, which disclose an examplary embodiment having a full alphabetic keyboard arrangement. In particular, as shown in FIGS. 7-8, only one letter of the alphabet is associated with any given alphabetic key within the keys of the keyfield. This is in contrast to reduced-format arrangements, in which multiple letters of the alphabet may be associated with at least some of the alphabetic keys of a keyboard. Additionally, as alluded to above and shown in the referenced figures, some of the alphabetic keys also have numbers, symbols, or functions associated with them. In the specifically illustrated embodiment, the alphabetic keys (including those also having numbers, symbols, or functions associated with them) are arranged in a QWERTY arrangement, although any of the other full-keyboard arrangements (QWERTZ, AZERTY, or Dvorak) may also be implemented within the scope of this disclosure.

As described above, the International Telecommunications Union ("ITU") has established phone standards for the arrangement of alphanumeric keys. The standard phone numeric key arrangement shown in FIGS. 5 (no alphabetic letters) and 6 (with alphabetic letters) corresponds to ITU Standard E.161, entitled "Arrangement of Digits, Letters, and Symbols on Telephones and Other Devices That Can Be Used for Gaining Access to a Telephone Network."This standard is also known as ANSI TI.703-1995/1999 and ISO/IEC 9995-8:1994. As shown in FIG. 9, the numeric key arrangement can be overlaid on a QWERTY arrangement. The numeric arrangement as shown can be aptly described as a top-to-bottom ascending order three-by-three-over-zero pattern.

While several keyboard layouts have been described above, the layouts can be described as having keys disposed on the keyboard in a QWERTY, reduced QWERTY, QWERTZ, Dvorak, or AZERTY key layout. These familiar keyboard layouts allow users to type more intuitively and quickly than, for example, on the standard alphabetic layout on a telephone pad. As mentioned above, the key arrangements can be reduced compared to a standard layout through the use of more than one letter or character per key. By utilizing fewer keys, the keys can be made larger and therefore more convenient to the user.

In at least one embodiment, a handheld wireless communication device 300 that is configured to send and receive email text messages comprises a hand cradleable body configured to be held in a text entry orientation by an operator or user as illustrated in FIGS. 1 and 7. The body of the handheld wireless communication device 300 has a front face 370 at which a display screen 322 is located and upon which information is displayed to the operator of the handheld device 300 in the text entry orientation. The handheld device 300 further comprises a microprocessor configured to execute software programs on the handheld device 300 and to receive operator commands from user inputs, such as a keyboard 333 and trackball navigational tool 325, located on the handheld device 300.

One of the programs installed on the handheld device 300 is a text message management program that is executed on the microprocessor of the handheld device 300. The text message management program includes a text message display application which displays a list of a plurality of received text messages such as SMS, MMS, or email messages on the display screen 322 and icon-differentiates at least a portion of the listed text messages using an icon associated with at least one text message and wherein the icon corresponds to a domain address of the associated text message. The domain address is a portion of an address associated with a recipient or sender of a text message that identifies an organization or other entity tied with an account of the recipient or sender of the text message.

The above described text message management program can be implemented as part of a handheld wireless device 300 as described above. The handheld wireless device 300 can include a key field 650 that is located below the display screen at the front face of the body 370 and the key field 650 comprises a plurality of keys of which a portion are alphanumeric input keys. These alphanumeric input keys comprise alphabetic keys which have letters arranged in one of the above described arrangements including but not limited to QWERTY, QWERTZ, AZERTY, and Dvorak arrangements. Furthermore, the arrangement can be of a full arrangement or reduced arrangement as described above, wherein the reduced arrangement has more than one letter associated with at least one key. As shown in FIG. 7, a full QWERTY arrangement is provided on keyboard 333 along with additional numeric, symbol and function keys. A reduced QWERTY arrangement is presented in FIG. 1. Additionally, a trackball navigation tool 321 is located between the display and the key field 650 in the text entry orientation.

If the handheld electronic device is capable of sending and receiving text messages, a text message management program can be provided therewith to facilitate sending and receiving text messages. In at least one embodiment, the text message management program is an email software program that is capable of sending and receiving email messages. In some examples, the email software is a stand alone application. In other examples, the email software can be integrated along with the operating system software. The email software program has an email application that is capable of displaying the email messages to the user. In one example, the email messages are presented by the email application as a listing as shown in FIG. 7. This listing of email messages can include both incoming and outgoing messages. For example, the email 426 near the center of the screen shown in FIG. 7 is an email message that has been sent to recipient identified as "Andrew" and the email 428 that is fourth from the top of list is an email received from sender identified as "Elizabeth." In other examples, the emails are grouped according to whether the message was sent to or from the user's mailbox. The email list can include an indicator icon 410 that informs the user whether message has been read, unread, sent, pending or failed to send. For example, a checkmark 416 can be used to indicate that an email has been sent and an opened envelope 418 to indicate that an email has been opened. Other indicators, such as changing the style of font for the remaining displayed information of the email message to normal, bold, or italic font or some combination thereof, are also considered within the scope of this disclosure. Additionally, a timestamp 412 and date stamp 408 can be provided to inform the user of the date and time the message was sent or received. Next, an icon 405 corresponding to a domain address of the email message shown on the same line. Then, the name 406 of the sender or recipient is displayed. Furthermore, the subject 414 of the email message is displayed. In some embodiments, another item is provided that informs the user of the priority of message such as high, low, or normal.

If the user wishes to open or view one of the email messages shown on the display, the user can make a selection of the desired email message. The user can make the selection of the desired email message through a variety of means such as a trackball, dedicated key, a select button, or selecting the email message on touch sensitive display screen with a stylus or other instrument. When the user makes the selection of an email message, the message can be displayed as shown in FIG. 8 in which an icon 444 associated with a domain of the email address is shown adjacent to the email address or name of a sender 446. While the icon 444 in this example is shown adjacent to the name of the sender 446, in other examples the icon 444 can be presented on another portion of the display screen 322 such as the top center or a corner of the display screen 322. Other locations of the icon 444 can be used as one skilled in the art would appreciate. As shown, the icon 444 is presented before the sender's name 446, but in other embodiments it may be presented after the sender's name 446. In these embodiments, the icon 444 would be presented in a row of information 442 indicating who the email is from. In yet another embodiment, the user can configure the email program to specify the location from a number of predetermined locations.

Additionally, the email program can be configured such that names or email addresses of recipients of an email message can be differentiated using an icon associated with that particular email address or name of the recipient as shown by the email program. These names or email addresses can appear in fields such as "TO," "CC," and "BCC" in addition to the "FROM" field as shown in FIG. 8. Thus, if an email message is sent to three email addresses each one of those email addresses can be differentiated with an icon corresponding to the domain address of the email address. Furthermore, different fields may be shown in the email message application depending on whether the email is sent to or from the email account that is viewable from the handheld device 300. Thus, while the above has been described in relation to the name of the recipient, the name of the sender can likewise be used in the email message as shown in FIG. 8.

This can be contrasted with the typical display of an email as shown in FIG. 1. If an icon is not found or the handheld device 300 is unable to establish a connection to the domain, then the email message can be displayed as shown in FIG. 1. Additionally, those email addresses that are not associated with a domain that has a domain icon will be listed similar to those emails addressed to and from Andrew in FIG. 7.

When the email message is icon-differentiated, it is possible to reveal the affiliation of the sender or recipient of the message without displaying properties related to that particular address or person's name. This can be useful in screening messages to determine which messages require immediate attention or those items that can be easily discarded. Furthermore, when the email program obtains the information relating to icon from the domain it servers as a further verification of the affiliation of the email address with the domain name.

While the above has been generally described as obtaining the domain name from the email address, the email address chosen for the determination of the domain name can be important as well. In a spam email, the email address displayed is often not the email address from which the email was sent. Thus, the email program can further enabled to make a determination of which domain to select based on the actual email address from which the message was sent rather than a displayed email address.

Additionally, the icon can be useful in other scenarios where it is desirable to enable a user of a handheld device 300 to make a determination regarding the organization with which a sender or recipient is associated. When the user recognizes a particular icon associated with that organization, the user can easily determine if the person to whom the email is sent or received from is the desired person. For instance with common names such as Jack Brown or Bill White, a user can determine which organization the particular sender or recipient is associated. These examples are provided to illustrate situations in which the icon-differentiated email messages may be useful and are not intended to limit the scope of this disclosure.

Furthermore, the above has been described in relation to email messages, other text or data messages sent to or from the handheld device 300 can likewise be differentiated such as SMS and MMS messages. Alternatively, a text message management application can be implemented that is capable of displaying at least one of email messages, SMS messages, and MMS messages. In other embodiments, separate text message management applications are provided for each one of email messages, SMS messages and MMS messages.

When the handheld wireless communication device 300 receives a text message, it attempts to obtain an icon from a domain associated with the text message. The icon that is associated with the domain comes from the standard domain icon. In a preferred embodiment, this standard domain icon is a favorites icon or a favicon associated with a particular website, webpage, or other domain viewable via a web browser. The favorites icon is often stored in the root directory. The favorites icon for instance can be ico file, a gif file, or a png file. While these files are the typical formats for the favorites icon, this disclosure includes other file types such as jpeg, tiff, and other standard image file formats.

In one embodiment, the text message application determines the domain associated with the received text message to obtain the icon from a server or website associated with that domain. The determination of the appropriate domain for a received message can be made through a variety of different ways. In one example, the domain is obtained from the address of the sender. In the example where the text message is an email message, the domain is part of the email address. The text message management program sends a request to the website associated with the domain. For instance, the domain address of a particular email address is that portion of the email address that follows an "@" symbol in the email address. Once this domain is obtained from the email address, the text message management program contacts the website or domain server associated with the domain. Once the icon is obtained from the website or domain server, the icon is stored on the handheld wireless communication device 300. This icon can later be retrieved from the storage location on the handheld wireless communication device 300 rather than re-contacting the website or domain server.

In another embodiment, the text message management program uses information stored on the handheld wireless communication device 300 to determine the domain associated with the text message. If the text message is from one of the contacts stored in an address book on the handheld device 300, a determination is made whether the contact information includes a domain that could be associated with the user. For example, the address book may contain a website address in the address book information. When the website address is provided in the address book, the text message management application obtains the icon from that website. Alternatively, if an email address is provided in the address book entry, the text message management application determines the domain address and obtains the icon from the domain address.

Once the icon has been obtained from the domain, the icon can either be stored in the flash memory or the RAM on the handheld device 300. When the icon is stored in flash memory or other permanent memory, it is possible to retrieve the icon from the storage location rather than reconnecting with the domain address.

While the above examples have been described in relation to email, one skilled in the art would appreciate the necessary modifications to allow lists and programs for SMS, MMS, PIN messages, instant messages, and similar messages to be displayed according to the above description provided in relation to email messages. Thus instead of an email program, the program could be one directed towards one of the above types of messages or the program could be capable of displaying all of the above types of messages. Likewise, the message that is displayed could be one of the above messages.

In yet another embodiment, the present disclosure includes a method for icon-differentiating at least a portion of a displayed email message on a handheld wireless communication device 300. An examplary method is described in relation to FIG. 9. The method includes running a text message management program on a handheld wireless communication device (block 490). Then the handheld wireless communication device displays a listing of a plurality of received text messages on a display screen (block 492). Additionally, the method includes differentiating at least a portion of the text messages displayed on the display screen using an icon associated with at least one text message and wherein said icon corresponds to a domain address of the associated text message (block 494). The method can further include obtaining the icon to be associated with a particular text message from the domain identified by the domain address of the text message. This text message is preferably an email message. Additionally, the method can display the icon associated with a particular email in a row of message identification information as described above. Furthermore, the domain associated with email message can be determined using one of the identification methods as described above. This method could apply equally to email messages, SMS messages, and MMS messages in addition to programs that are associated with each of these types of messages.

Examplary embodiments have been described hereinabove regarding both handheld wireless communication devices 300, as well as the communication networks 319 within which they operate. Again, it should be appreciated that the focus of the present disclosure is a text message management program that is capable of displaying a listing of received text messages and icon-differentiating at least a portion of the display listed text messages using an icon associated with at least one text message and wherein the icon corresponds to a domain address of the associated text message.

What is claimed is:

1. A communications device including a screen, the communications device comprising:
   a processor in data communication with the screen, the processor configured to:
   display a message having at least one field;
   obtain an identifying icon associated with a domain identified with at least one address; and
   display the identifying icon in the field.

2. The communications device as recited in claim 1, wherein the message is one of a SMS message, an MMS, and email message.

3. The communications device as recited in claim 1, wherein the message is an incoming message.

4. The communications device as recited in claim 1, wherein the message is outgoing message.

5. The communications device as recited in claim 1, wherein the identifying icon is displayed in a row containing identification information related to the domain.

6. The communications device as recited in claim 5, wherein the identification information comprises at least one of a sender name, recipient name, subject, receipt time and date, sent time and date, and message status.

7. The communications device as recited in claim 1, wherein the address recipient follows an "@" symbol.

8. The communications device as recited in claim 1, further comprising a key field disposed proximate the screen, the key field comprising a plurality of keys of which a portion are alphanumeric, the alphanumeric keys comprising a plurality of alphabetic keys, each alphabetic key having at least one letter associated therewith, the alphabetic keys being arranged in one of a QWERTY, QWERTZ, AZERTY and Dvorak arrangement.

9. The communications device as recited in claim 8, wherein the letters are associated with the alphabetic keys, one letter per key.

10. The communications device as recited in claim 8, wherein at least one alphabetic key is associated with a plurality of letters.

11. A method of displaying messages on a communications device, the method comprising:
    executing a message management program on a processor housed within the communications device;
    displaying, on a display coupled to the processor, a message having at least one field;
    obtaining an identifying icon associated with a domain identified with at least one address; and
    displaying, on the display, the identifying icon in the at least one field.

12. The method as recited in claim 11, further comprising displaying the icon in a row of message identification information related to the message.

13. The method as recited in claim 12, wherein message identification information comprises at least one of a: name of a sender, name of a recipient, subject, date received, date sent, time received, time sent and status of the message.

14. The method as recited in 11, wherein the identifying icon includes an image identifying an organization with which the domain is associated.

15. The method of claim 11, wherein the address is preceded by an "@" symbol.

16. A non-transitory memory storing instructions that, when loaded into a communications device, are executable to:
    send messages to at least one recipient;
    display an outgoing message having a "TO" field;
    obtain an identifying icon associated with a domain identified with the at least one recipient; and
    display an outgoing message and the identifying icon associated with the at least one recipient in the "TO" field.

17. The non-transitory memory as recited in claim 16, storing instructions that are executable to display the identifying icon associated with the at least one recipient in a row of message identification information related to the particular email message.

18. A non-transitory memory storing instructions that, when loaded into a communications device, are executable to:
    display a message having at least one field;
    obtain an identifying icon associated with a domain identified with at least one address; and
    display the identifying icon the field.

19. The non-transitory memory as recited in claim 18, wherein the message is one of a SMS message, an MMS, and email message.

20. The non-transitory memory as recited in claim 18, wherein the message is an incoming message.

* * * * *